US012135892B2

(12) United States Patent
Suzuki et al.

(10) Patent No.: US 12,135,892 B2
(45) Date of Patent: Nov. 5, 2024

(54) STORAGE SYSTEM AND DATA TRANSFER METHOD THAT SUPPRESS A DROP IN THE I/O PERFORMANCE OF THE STORAGE DEVICE CAUSED BY A REBALANCING

(71) Applicant: Hitachi, Ltd., Tokyo (JP)

(72) Inventors: Takanobu Suzuki, Tokyo (JP); Tsukasa Shibayama, Tokyo (JP); Akira Deguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 17/943,517

(22) Filed: Sep. 13, 2022

(65) Prior Publication Data

US 2023/0266907 A1 Aug. 24, 2023

(30) Foreign Application Priority Data

Feb. 18, 2022 (JP) .................. 2022-024249

(51) Int. Cl.
*G06F 3/06* (2006.01)
(52) U.S. Cl.
CPC .......... *G06F 3/0647* (2013.01); *G06F 3/0604* (2013.01); *G06F 3/0679* (2013.01)
(58) Field of Classification Search
CPC .... G06F 3/0647; G06F 3/0604; G06F 3/0679; G06F 3/0631; G06F 3/061; G06F 3/067; G06F 3/0689; G06F 3/06
See application file for complete search history.

(56) References Cited

U.S. PATENT DOCUMENTS

| | | | |
|---|---|---|---|
| 11,726,684 B1* | 8/2023 | Sangle | G06F 3/061 711/171 |
| 2010/0049934 A1 | 2/2010 | Tomita et al. | |
| 2011/0066823 A1* | 3/2011 | Ando | G06F 3/0605 711/171 |
| 2013/0036266 A1* | 2/2013 | Naganuma | G06F 3/061 711/170 |
| 2018/0121100 A1* | 5/2018 | Auvenshine | G06F 3/0611 |
| 2019/0065068 A1* | 2/2019 | Hardy | G06F 3/0665 |
| 2023/0168934 A1* | 6/2023 | Vaka | H04L 67/1097 718/104 |

FOREIGN PATENT DOCUMENTS

JP 2010-049573 A 3/2010

* cited by examiner

*Primary Examiner* — Khoa D Doan
(74) *Attorney, Agent, or Firm* — Volpe Koenig

(57) ABSTRACT

A processor of each node of a storage system executes rebalancing to transfer a volume between pool volumes for the node in such a way as to equalize throughput of a data input/output process and/or data capacities between the pool volumes making up the pool. When a plurality of external volumes are transferred to a node in the storage system, the storage management apparatus determines a transfer destination node for the volumes and order of transferring the volumes and executes volume transfer in such a way as to equalize throughput of the data input/output process and/or data capacities between the pool volumes making up the pool after completion of or during the volume transfer.

12 Claims, 21 Drawing Sheets

| VOL ID | MAXIMUM CAPACITY | USED CAPACITY | AVERAGE THROUGHPUT | ACCESSING SEVER ID | ACCESSING APPLICATION ID | WHETHER BEING VOLUME TO BE TRANSFERRED OR NOT |
|---|---|---|---|---|---|---|
| 1 | 10TB | 5TB | 10KIOPS | 1 | 1 | VOLUME TO BE TRANSFERRED |
| 2 | 5TB | 3TB | 5KIOPS | 2 | 2 | VOLUME TO BE TRANSFERRED |
| 3 | 15TB | 2TB | 15KIOPS | 1 | 1 | VOLUME TO BE TRANSFERRED |
| 4 | 5TB | 4TB | 5KIOPS | 3 | 3 | VOLUME TO BE TRANSFERRED |
| 5 | 10TB | 8TB | 10KIOPS | 3 | | NOT VOLUME TO BE TRANSFERRED |
| ... | | | | | | |

FIG. 7

| TRANSFER ORIGIN VOL ID | TRANSFER DESTINATION VOL ID | DEFINED CAPACITY | USED CAPACITY | AVERAGE THROUGHPUT | ACCESSING SERVER ID | ACCESSING APPLICATION ID | TRANSFER DESTINATION NODE ID |
|---|---|---|---|---|---|---|---|
| 1 | 1 | 10TB | 5TB | 10KIOPS | 1 | 1 | 1 |
| 2 | 2 | 5TB | 3TB | 5KIOPS | 2 | 2 | 2 |
| 3 | 3 | 15TB | 2TB | 15KIOPS | 1 | 1 | 3 |
| 4 | 4 | 5TB | 4TB | 5KIOPS | 3 | 3 | 2 |
| ... | | | | | | | |

| ON-OPERATION SERVER ID | APPLICATION ID | TRANSFER PRIORITY LEVEL | 235f |
|---|---|---|---|
| 1 | 1 | 1 | |
| 2 | 2 | 2 | |
| 3 | 3 | 0 | |
| 3 | 4 | 3 | |
| ... | | | |

FIG. 9

| GROUP ID | TRANSFER ORIGIN LOGICAL VOLUME ID | ACCESSING SEVER ID | ACCESSING APPLICATION ID | PRIORITY LEVEL | TRANSFER STATUS |
|---|---|---|---|---|---|
| 1 | 1, 3 | 1 | 1 | 1 | BEING TRANSFERRED |
| 2 | 2 | 2 | 2 | 2 | NOT TRANSFERRED YET |
| 3 | 4 | 3 | 3 | 0 | ALREADY TRANSFERRED |
| ... | | | | | |

| NODE ID | TOTAL CAPACITY | USED CAPACITY | TOTAL PERFORMANCE | USED PERFORMANCE | ON-USE INSTANCE ID | ON-USE LOGICAL VOLUME ID | NUMBER OF ON-USE LOGICAL VOLUMES | NODE GROUP ID |
|---|---|---|---|---|---|---|---|---|
| 1 | 20TB | 10TB | 30KIOPS | 10KIOPS | 1 | 3 | 1 | 1 |
| 2 | 20TB | 15TB | 30KIOPS | 15KIOPS | 1 | 3 | 1 | 1 |
| 3 | 20TB | 7TB | 30KIOPS | 10KIOPS | 1 | 3 | 1 | 1 |
| ⋮ | | | | | | | | |

FIG. 11

| VOL ID | DEFINED CAPACITY | USED CAPACITY | AVERAGE THROUGHPUT | ACCESSING SEVER ID |
|---|---|---|---|---|
| 1 | 10TB | 5TB | 10KIOPS | 1 |
| 2 | 5TB | 3TB | 5KIOPS | 2 |
| 3 | 15TB | 2TB | 15KIOPS | 1 |
| 4 | 5TB | 4TB | 5KIOPS | 3 |

| ID | TYPE | PERFORMANCE | CHARGE | |
|---|---|---|---|---|
| 1 | NODE | 30KIOPS | 5$/hour | 235k |
| 2 | NODE | 200KIOPS | 20$/hour | |
| 3 | VOLUME | 25KIOPS | 2$/GB/month | |
| 4 | VOLUME | 50KIOPS | 4$/GB/month | |
| ... | | | | |

STORAGE SYSTEM AND DATA TRANSFER METHOD THAT SUPPRESS A DROP IN THE I/O PERFORMANCE OF THE STORAGE DEVICE CAUSED BY A REBALANCING

BACKGROUND OF THE INVENTION

1. Field of the Invention

The present invention relates to a storage system and a data transfer method for the storage system.

2. Description of the Related Art

JP 2010-49573 A discloses a related art in the field of the present invention. This literature describes a technique by which when transferring data from a certain volume to a different volume in the same storage device, an administrator of the storage device selects a volume to which the data is transferred, in accordance with an I/O process load of the storage device. This technique allows data transfer to be executed as an influence on the I/O process is kept small.

SUMMARY OF THE INVENTION

A case has been established in recent years, in which a transfer origin storage device and a transfer destination storage device are different from each other and a scale-out storage device is selected as a data transfer destination for cost reduction, the scale-out storage device being composed of a cluster of virtual machines running on a cloud system. In the case of the scale-out storage device, a rebalancing process is carried out. This rebalancing process equalizes capacities and performances of computers making up the cluster when a computer is added to the cluster or when a certain computer is so dominant in capacity and performance that the total capacity and performance are unbalanced. Because the rebalancing process involves data exchanges between computers, the I/O performance of the storage device may drop during the rebalancing process.

When the transfer destination storage device is the scale-out type, executing data transfer without invoking the rebalancing process requires properly defining and changing a configuration of the transfer destination storage device and properly selecting a transfer destination volume.

In this regard, however, JP 2010-49573 A makes no reference, and, does not discuss an assumed case where a transfer origin storage device and a transfer destination storage device are different from each other. JP 2010-49573 A thus does not refer to a technique for properly defining the configuration of the transfer destination storage device and properly selecting the transfer destination volume.

The present invention has been conceived in view of the above problem, and it is therefore an object of the present invention to provide a technique by which a configuration of a transfer destination storage device is defined properly, a transfer destination volume is selected properly, and a drop in the I/O performance of the storage device caused by a rebalance process etc., can be suppressed.

In order to solve the above problems, according to an aspect of the present invention, a storage system includes: a plurality of nodes each having a processor; a storage device; and a storage management apparatus. In the storage system, the processor of each node forms a pool volume for the node, using a storage area of the storage device, a plurality of pool volumes corresponding to a plurality of nodes are used to configure a pool, a volume to be provided to a host is allocated to the pool and the pool volumes, a data input/output process of inputting/outputting data to/from the storage device is executed through a volume allocated to the pool volume, and rebalancing is executed to transfer the volume between pool volumes for the nodes in such a way as to equalize throughput of the data input/output process and/or data capacities between the pool volumes making up the pool. When a plurality of external volumes are transferred to a node in the storage system, the storage management apparatus determines a transfer destination node for the volumes and order of transferring the volumes and executes volume transfer in such a way as to equalize throughput of the data input/output process and/or data capacities between the pool volumes making up the pool after completion of or during the volume transfer.

According to an aspect of the present invention, for example, by properly defining a configuration of a transfer destination storage device, properly selecting a transfer destination volume, and suppressing a drop in the I/O performance of the storage device caused by a rebalancing process etc., the storage system is kept run stably with less cost.

BRIEF DESCRIPTION OF THE DRAWINGS

FIG. 6 depicts a configuration example of a transfer origin storage device configuration/operation information table of the storage management apparatus;

FIG. 7 depicts a configuration example of a transfer destination storage device configuration/operation information table of the storage management apparatus;

FIG. 8 depicts a configuration example of an application information table of the storage management apparatus;

FIG. 9 depicts a configuration example of a transfer group table of the storage management apparatus;

FIG. 10 depicts a configuration example of a transfer destination storage device node table of the storage management apparatus;

FIG. 11 depicts a configuration example of a storage device configuration/operation information table of the transfer origin storage device and the same of the transfer destination storage device;

FIG. 12 depicts a configuration example of an instance/volume type storage table of the storage management apparatus;

DESCRIPTION OF THE PREFERRED EMBODIMENTS

Figure 1:
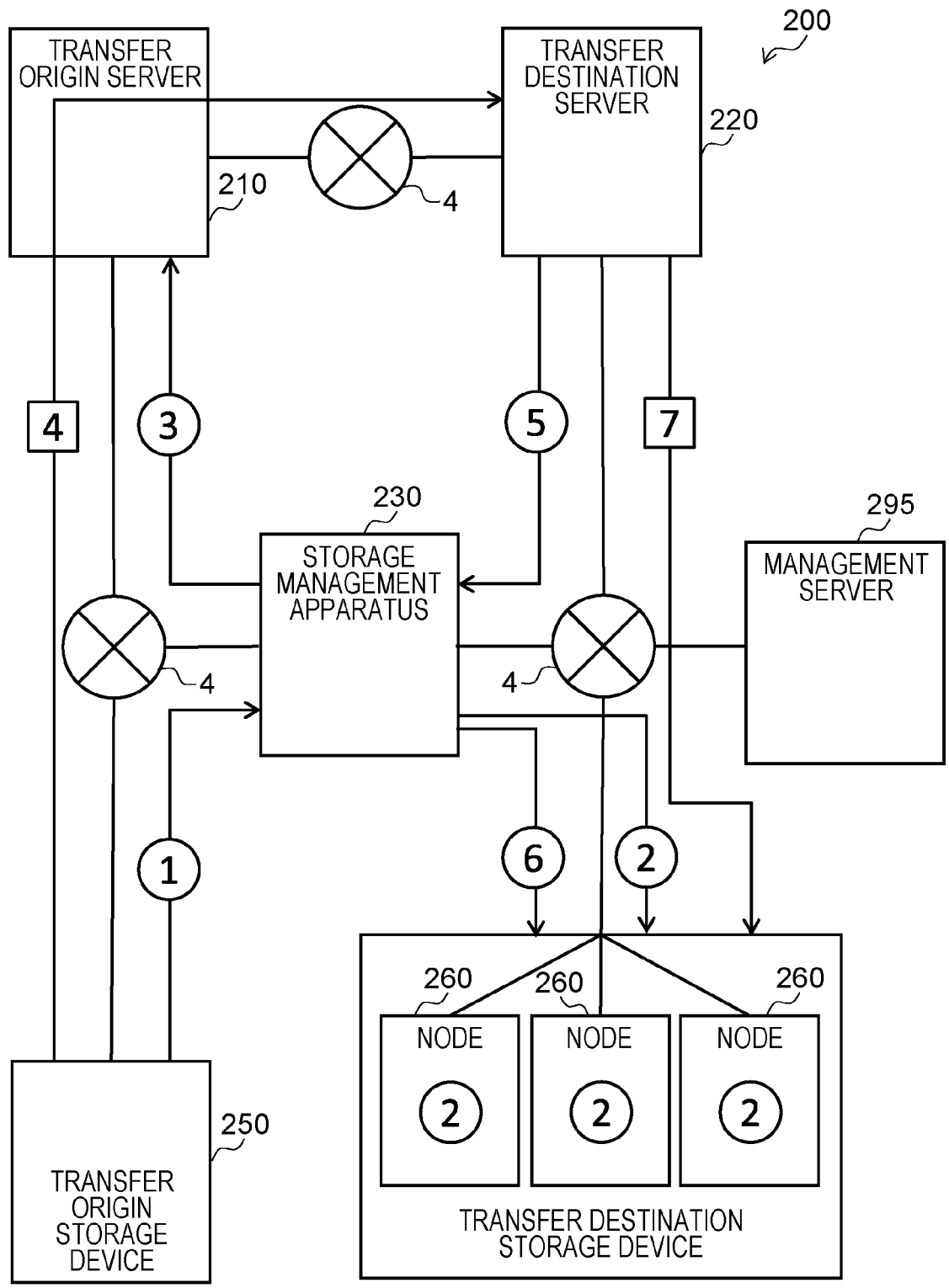
FIG. 1 is a schematic diagram of a process of defining a configuration of a data transfer destination storage device and transferring data, the process being executed by a storage management apparatus according to a first embodiment.

Embodiments of the present invention will hereinafter be described with reference to the drawings. It should be noted that embodiments described below, which include drawings, are exemplary embodiments, and are not intended for putting limitations on the scope of the invention defined in claims. Not all elements and combinations thereof described in the embodiments are necessarily essential to solutions provided by the invention. A configuration that is essential to the invention but is already known well may be omitted in illustration and description of configurations.

In the following description, when elements of the same type are described with no particular distinction thereof being made, a reference numeral (or a common reference numeral) may be used, and when such elements are described with particular distinction thereof being made, element identification numbers (or reference numerals) may be used. The number of elements shown in each drawing is exemplary, and is not limited to the number indicated in the drawing.

In the following description, for example, pieces of information are expressed as "xxx table" in some cases. These pieces of information, however, may be expressed as data structures different from lists or tables. To indicate that pieces of information do not depend on their data structures, "xxx table" may be referred to as "xxx information".

In the following description, a "storage system" is, for example, a computer system including one or more computers. The "storage system" may further include, in addition to the computer, a device different from the computer. The computer is either a physical computer or a virtual computer.

In the following description, a "storage management apparatus" includes one or more computers. For example, the storage management apparatus is a management computer that displays information on a display device. In addition, the storage management apparatus is, for example, a system that includes at least a management computer out of a combination of a management computer (e.g., a server) and a display computer (e.g., a client) that displays information received from the management computer.

In the following description, a "drive" refers to one or a plurality of physical storage devices, and typically represents a nonvolatile storage device (e.g., an auxiliary storage device). The drive is provided as, for example, a hard disk drive (HDD) or a solid state drive (SSD). Drives of different types may present together in a storage system.

In the following description, a central processing unit (CPU) is an example of one or a plurality of processors. The processor is, for example, a microprocessor, such as a CPU, but may be a different type of processor, such as a graphics processing unit (GPU). The processor is either a single-core type or a multi-core type. Furthermore, the processor may be a processor in a broad sense, such as a hardware circuit (e.g., a field-programmable gate array (FPGA)) or an application specific integrated circuit (ASIC) that carries out part or all of processing.

In the following description, processing may be described in context in which a "program" or a process thereof serves as the subject. Because a program is run by the processor to carry out a given process while properly using storage resources (e.g., a memory) and/or a communication interface (e.g., a communication port), the primary agent of processing can be defined as the processor. Operating according to a program, the processor implements a functional unit that exerts a given function. It follows from the above, therefore, that "xxx program" can be rephrased as "xxx unit". An apparatus and a system that include processors are therefore an apparatus and a system that include such functional units.

In the following description, a program may be installed in such a device as a computer or may be recorded in a program distribution server or a computer-readable recording medium (e.g. non-transitory recording medium). In the following description, two or more programs may be implemented as one program or one program may be implemented as two or more programs.

First Embodiment (Process of Defining Configuration of Data Transfer Destination Storage Device According to First Embodiment and Transferring Data)

FIG. 1 is a schematic diagram of a process of defining a configuration of a data transfer destination storage device and transferring data, the process being executed by a storage management apparatus 230 according to a first embodiment. A storage system 200 includes a transfer origin server 210 (transfer origin host), a transfer destination server 220 (transfer destination host), a storage management apparatus 230, a transfer origin storage device 250, and a transfer destination storage device 260. The transfer origin storage device 250 is an example of a system serving as a volume transfer origin. The system as the volume transfer origin is provided as a single or a plurality of systems. Arrows in FIG. 1 indicate flows of information necessary for processing or flows of data to be transferred. Numbers appended to arrows in FIG. 1 indicate the order of flows of information necessary for processing or flows of data to be transmitted. Among these numbers, numbers in circles indicate flows of information necessary for processing, and numbers in squares indicate flows of data to be transmitted.

The storage management apparatus 230 acquires performance information and capacity information on a volume to be transferred, from a transfer origin storage device 250 ("1" in FIG. 1). Based on the performance information and capacity information on the volume to be transferred, both information being acquired from the transfer origin storage device 250, the storage management apparatus 230 defines a configuration of the transfer destination storage device 260 and starts it ("2" in FIG. 1).

The storage management apparatus 230 instructs the transfer origin server 210 to transfer data from the transfer origin storage device 250 to the transfer destination server 220 ("3" in FIG. 1). Following the instruction from the storage management apparatus 230, the transfer origin server 210 reads data from the transfer origin storage device 250 and transfers the read data to the transfer destination server 220 ("4" in FIG. 1). The storage management apparatus 230 acquires a data transfer status from the transfer destination server 220 ("5" in FIG. 1).

When the progress of data transfer from the transfer origin storage device 250 to the transfer destination server 220 reaches a certain level or higher level, the storage management apparatus 230 instructs the transfer destination storage device 260 to transfer data from the transfer destination server 220 ("6" in FIG. 1). Following the instruction from the storage management apparatus 230, the transfer destination storage device 260 transfers data from the transfer destination server 220 to the transfer destination storage device 260 ("7" in FIG. 1).

In this manner, by selecting a transfer destination volume after properly defining the configuration of the transfer destination storage device 260, data transfer can be carried out without invoking a rebalancing process.

(Configuration of Storage System 200 According to First Embodiment)

Figure 2:
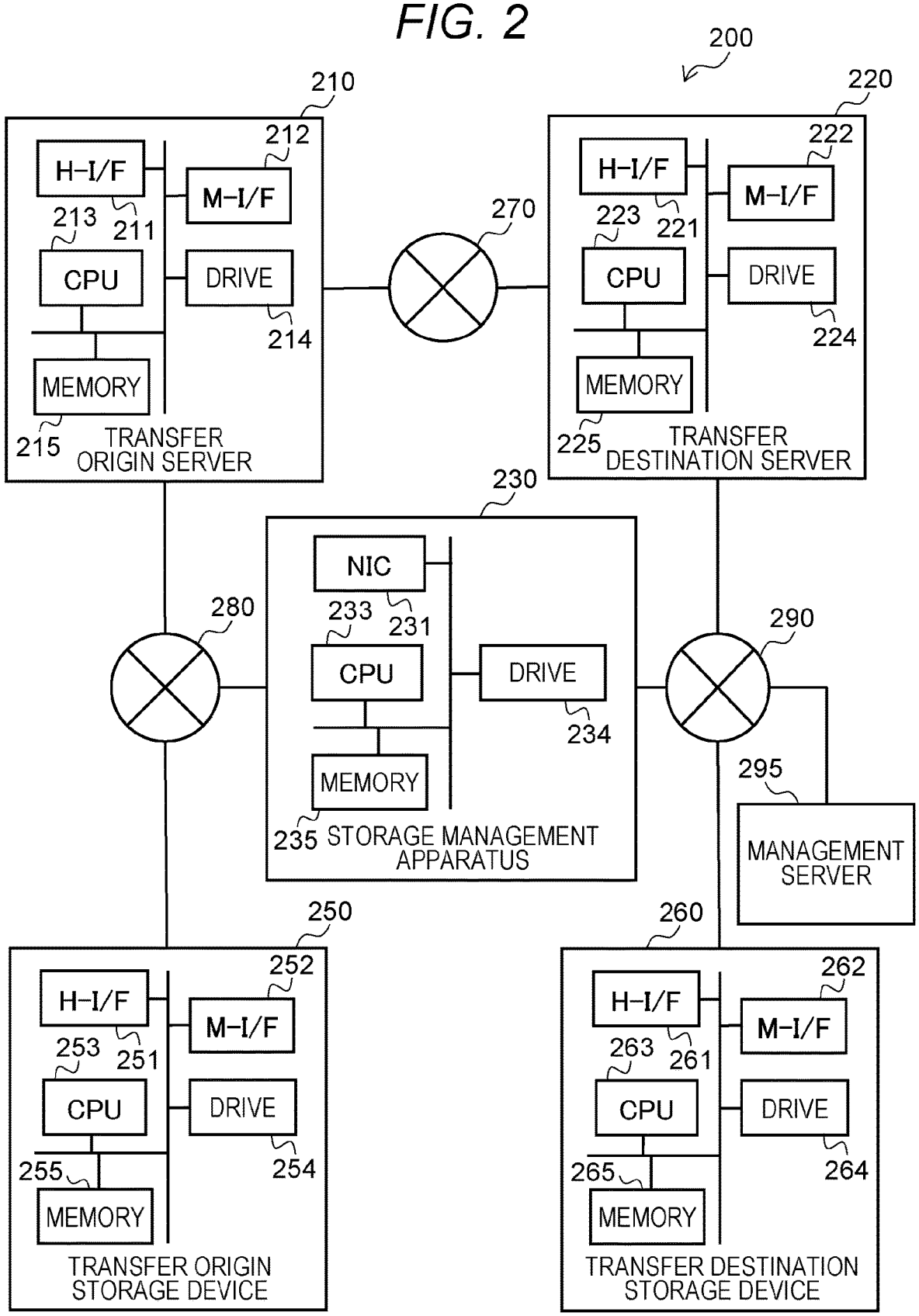
FIG. 2 depicts a configuration example of a storage system according to the first embodiment.

FIG. 2 depicts a configuration example of the storage system 200 according to the first embodiment.

The storage system 200 includes the transfer origin server 210, the transfer destination server 220, the storage management apparatus 230, the transfer origin storage device 250, the transfer destination storage device 260, and a management server 295.

The transfer origin storage device 250 includes a plurality of drives 254. The transfer origin storage device 250 includes also a host interface (H-I/F) 251 connected to the transfer origin server 210, a management interface (M-I/F) 252 connected to the storage management apparatus 230, a memory 255, and a CPU 253 connected to these elements 251, 252, 254, and 255.

The H-I/F 251 is, for example, a host bus adapter (HBA). The M-I/F 252 is, for example, a network interface card (NIC). The transfer origin server 210 and the H-I/F 251 of the transfer origin storage device 250 are interconnected via a network 280. The storage management apparatus 230 and the M-I/F 252 are interconnected via the network 280. The network connecting the transfer origin server 210 to the transfer origin storage device 250 may be different from the network connecting the transfer origin storage device 250 to the storage management apparatus 230.

The network 280 is, for example, any one of an internet protocol storage area network (IP SAN), a local area network (LAN), and a wide area network (WAN).

In this manner, the transfer origin storage device 250 has physical computer resources including the drive 254, the H-I/F 251, the M-I/F 252, the memory 255, and the CPU 253. The transfer origin storage device 250 provides a logical volume to the transfer origin server 210. The transfer origin storage device 250 receives an I/O command (i.e., a write command or read command) from the transfer origin server 210, the I/O command designating a logical volume, and processes the I/O command.

The transfer destination storage device 260 includes a plurality of drives 264. The transfer destination storage device 260 includes also a host interface (H-I/F) 261 connected to the transfer destination server 220, a management interface (M-I/F) 262 connected to the storage management apparatus 230, a memory 265, and a CPU 263 connected to these elements 261, 262, 264, and 265.

The H-I/F 261 is, for example, a host bus adapter (HBA). The M-I/F 262 is, for example, a network interface card (NIC). The transfer destination server 220 and the H-I/F 261 of the transfer destination storage device 260 are interconnected via a network 290. The storage management apparatus 230 and the M-I/F 262 are interconnected via the network 290. The network connecting the transfer destination server 220 to the transfer destination storage device 260 may be different from the network connecting the transfer destination storage device 260 to the storage management apparatus 230.

The network 290 is, for example, any one of an internet protocol storage area network (IP SAN), a local area network (LAN), and a wide area network (WAN).

In this manner, the transfer destination storage device 260 has physical computer resources including the drive 264, the H-I/F 261, the M-I/F 262, the memory 265, and the CPU 263. The transfer destination storage device 260 provides a logical volume to the transfer destination server 220. The transfer destination storage device 260 receives an I/O command (i.e., a write command or read command) from the transfer destination server 220, the I/O command designating a logical volume, and processes the I/O command.

The storage management apparatus 230 includes an NIC 231, a drive 234, a memory 235, and a processor 233 connected to these elements 231, 234, and 235. The storage management apparatus 230 is connected to the transfer origin storage device 250 via the network 280. The network 280 is, for example, any one of an internet protocol storage area network (IP SAN), a local area network (LAN), and a wide area network (WAN).

The storage management apparatus 230 is connected to the transfer destination storage device 260 via the network 290. The network 290 is, for example, any one of an internet protocol storage area network (IP SAN), a local area network (LAN), and a wide area network (WAN).

The transfer origin server 210 includes a drive 214. The transfer origin server 210 includes also a host interface (H-I/F) 211 connected to the transfer origin storage device 250, a management interface (M-I/F) 212 connected to the transfer destination server 220 and to the storage management apparatus 230, a memory 215, and a CPU 213 connected to these elements 211, 212, 214, and 215. The H-I/F 211 is, for example, a host bus adapter (HBA). The M-I/F 212 is, for example, a network interface card (NIC). The transfer origin server 210 and the H-I/F 251 of the transfer origin storage device 250 are interconnected via a network 280. The transfer origin server 210 and the transfer destination server 220 are interconnected via a network 270. The transfer origin server 210 and the storage management apparatus 230 are interconnected via the network 280.

The transfer destination server 220 includes a drive 224. The transfer destination server 220 includes also a host interface (H-I/F) 221 connected to the transfer destination storage device 260, a management interface (M-I/F) 222 connected to the transfer origin server 210 and to the storage management apparatus 230, a memory 225, and a CPU 223 connected to these elements 221, 222, 224, and 225 The H-I/F 221 is, for example, a host bus adapter (HBA). The M-I/F 222 is, for example, a network interface card (NIC). The transfer destination server 220 and the H-I/F 261 of the transfer destination storage device 260 are interconnected via a network 290. The transfer origin server 210 and the transfer destination server 220 are interconnected via a network 270. The transfer destination server 220 and the storage management apparatus 230 are interconnected via the network 290.

(Configuration of Memory 235 of Storage Management Apparatus 230)

Figure 3:
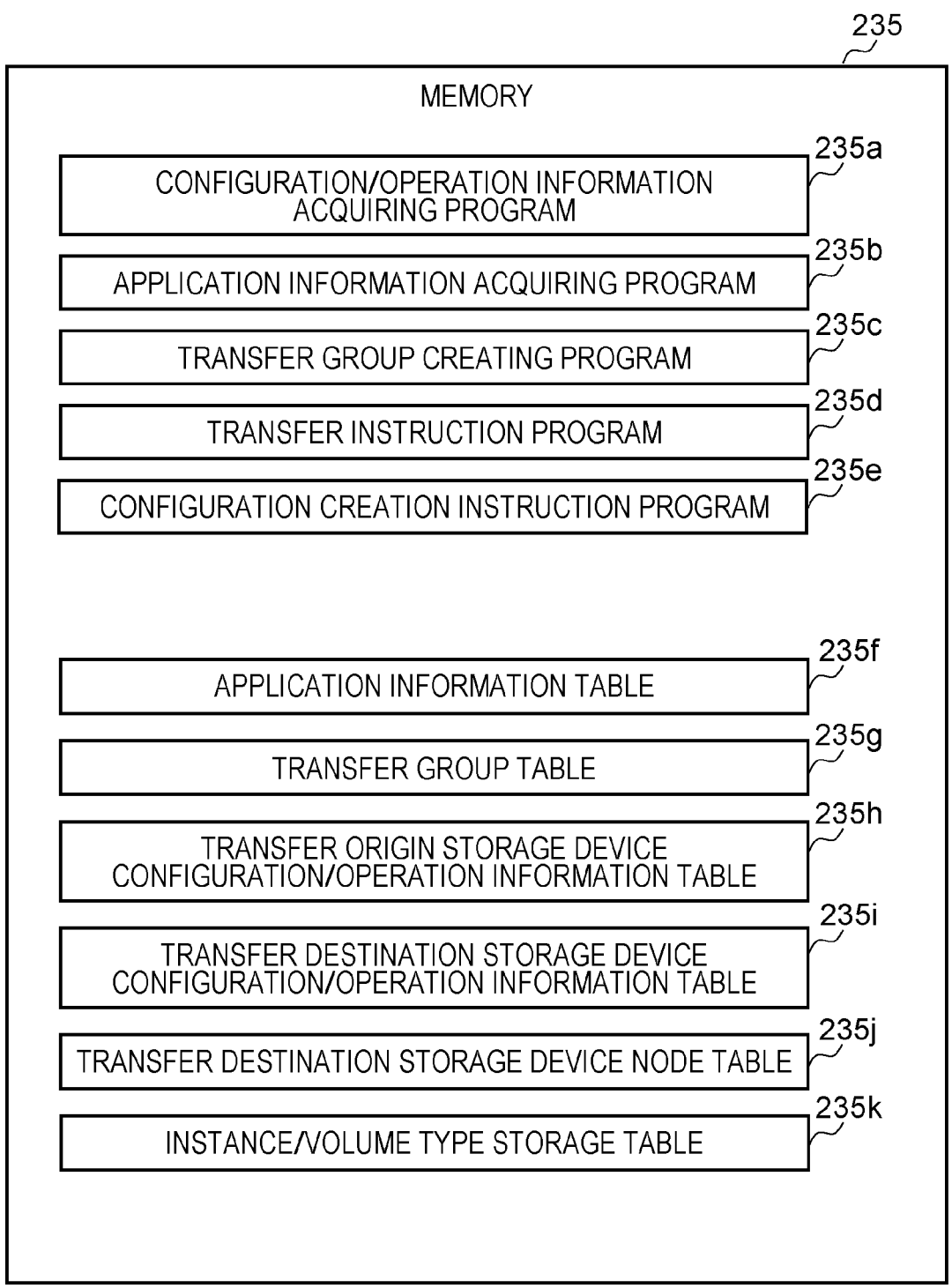
FIG. 3 depicts a configuration example of a memory of a storage management apparatus.

FIG. 3 depicts a configuration example of the memory 235 of the storage management apparatus 230. A program in the memory 235 is executed by the CPU 233.

A configuration/operation information acquiring program 235*a* is activated periodically, acquires configuration information (volume definition information) and operation information (information on a storage device activated, such as a volume's throughput), from the transfer origin storage device 250, and stores the configuration information and the operation information in a transfer origin storage device configuration/operation information table 235*h*.

An application information acquiring program 235*b* receives input from a user, and stores the input in an application information table 235*f*. A transfer group creating program 235*c* is activated in response to a transfer instruction from the user, and updates a transfer group table 235*g*, referring to the transfer origin storage device configuration/operation information table 235*h*, a transfer destination storage device configuration/operation information table 235*i*, and the application information table 235*f*.

A transfer instruction program 235*d* communicates with the transfer origin server 210 and with the transfer destination storage device 260, and gives an instruction to start a data transfer process. A configuration creation instruction program 235*e* transmits an instruction to create a virtual machine making up the transfer destination storage device 260, to the management server 295, referring to the transfer destination storage device configuration/operation information table 235*i* and an instance/volume type storage table 235*k*, and activates the transfer destination storage device 260.

(Configuration of Memory 255 of Transfer Origin Storage Device 250)

Figure 4:
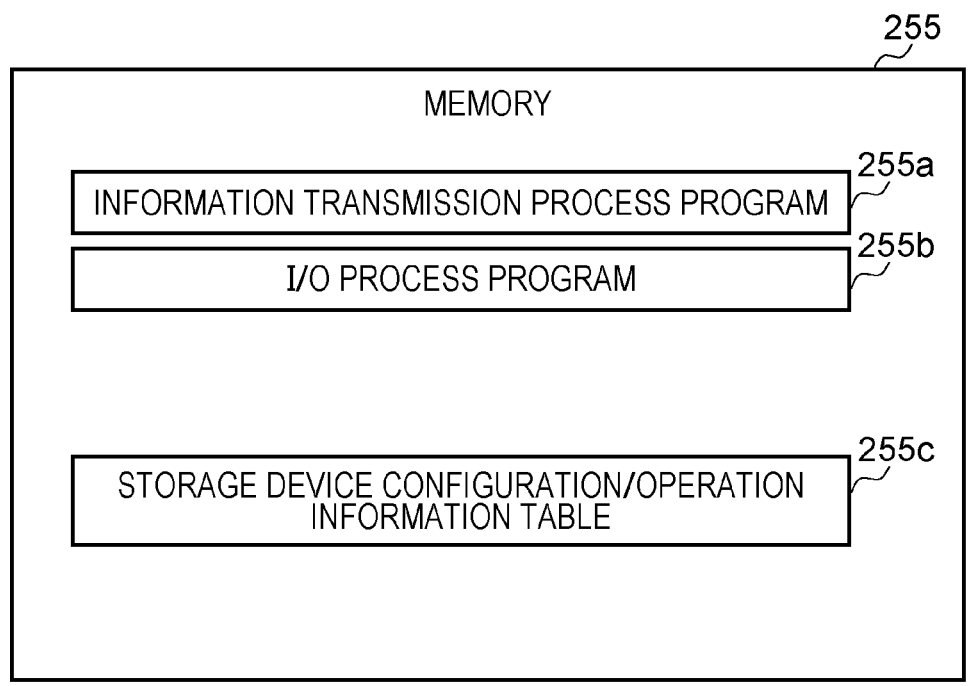
FIG. 4 depicts a configuration example of a memory of a transfer origin storage device.

FIG. 4 depicts a configuration example of the memory 255 of the transfer origin storage device 250. A program in the memory 255 is executed by the CPU 253. In response to an information acquisition request from the storage management apparatus 230, an information transmission process program 255*a* refers to a storage device configuration/operation information table 255*c* and transmits information to the storage management apparatus 230. An I/O process program 255*b* receives a command from the transfer origin server 210, carries out an I/O process, and updates the storage device configuration/operation information table 255*c*.

(Configuration of Memory 265 of Transfer Destination Storage Device 260)

Figure 5:
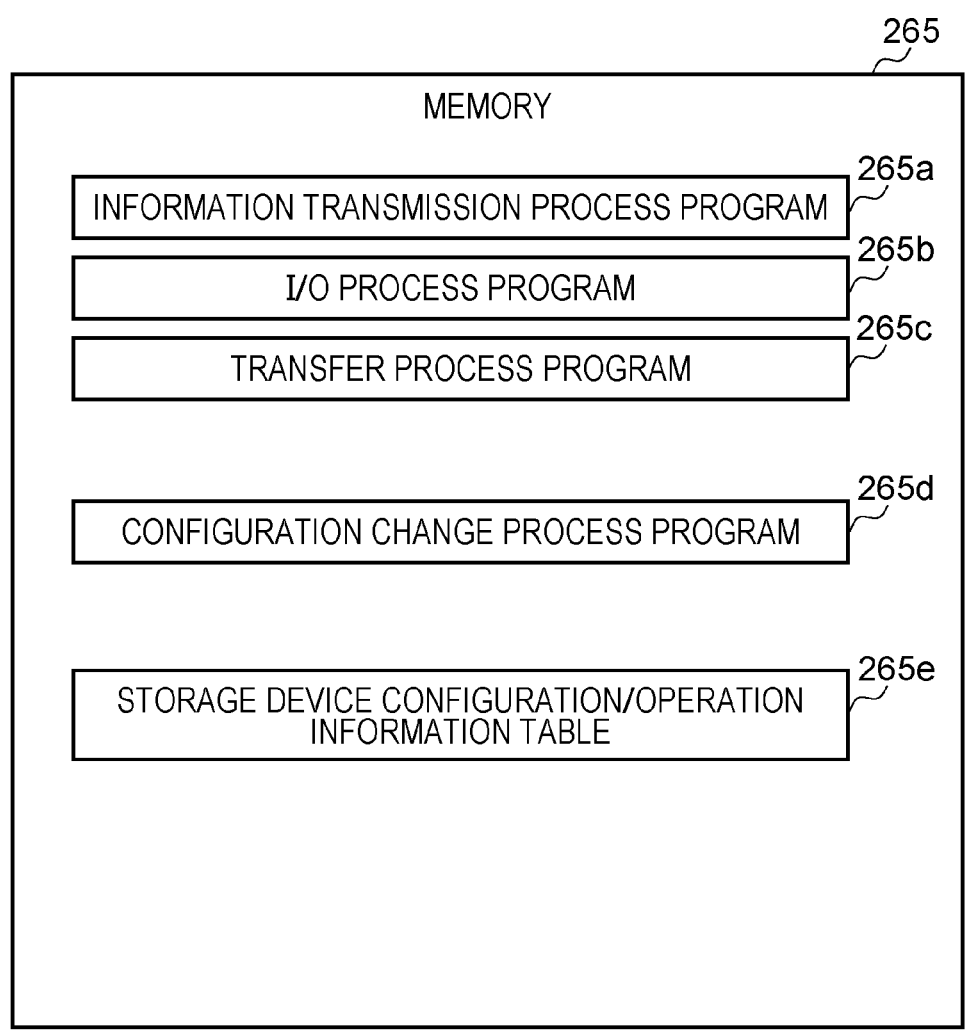
FIG. 5 depicts a configuration example of a memory of a transfer destination storage device.

FIG. 5 depicts a configuration example of the memory 265 of the transfer destination storage device 260. A program in the memory 265 is executed by the CPU 263. In response to an information acquisition request from the storage management apparatus 230, an information transmission process program 265*a* refers to a storage device configuration/operation information table 265*e* and transmits information to the storage management apparatus 230. An I/O processing program 265*b* receives a command from the transfer destination server 220, and carries out an I/O process.

A transfer process program 265*c* is activated in response to a transfer instruction from the storage management apparatus 230, and updates the storage device configuration/operation information table 265*e*. A configuration change process program 265*d* is activated in response to a configuration change instruction from the storage management apparatus 230, and updates the storage device configuration/operation information table 265*e*.

In the memory 265, a rebalancing process program is stored, which when a certain node is unbalanced in capacity or I/O process performance among nodes making up the transfer destination storage device 260, equalizes capacities or I/O process performances of nodes in a cluster.

(Configuration of Transfer Origin Storage Device Configuration/Operation Information Table 235*h*)

FIG. 6 depicts a configuration example of the transfer origin storage device configuration/operation information table 235*h* of the storage management apparatus 230. The transfer origin storage device configuration/operation information table 235*h* holds pieces of information of an ID for a logical volume defined in the transfer origin storage device 250 (VOL ID), a maximum capacity of the logical volume, a used capacity of the logical volume, the average number of I/O commands processed for the logical volume (average throughput), an ID for an accessing server that accesses the logical volume, an ID for an accessing application program that accesses the logical volume, and whether the logical volume is a volume to be transferred or not.

The storage management apparatus 230 acquires these pieces of information, except the ID for the accessing application, from the transfer origin storage device 250, using the configuration/operation information acquiring program 235*a*, and stores the acquired information in the table. The ID for the accessing application is acquired as user input information, using the application information acquiring program 235*b*, and is stored in the table.

(Configuration of Transfer Destination Storage Device Configuration/Operation Information Table 235*i*)

FIG. 7 depicts a configuration example of the transfer destination storage device configuration/operation information table 235*i* of the storage management apparatus 230. The transfer destination storage device configuration/operation information table 235*i* holds information of an ID for a logical volume defined in the transfer origin storage device 250 (transfer origin VOL ID), an ID for a logical volume defined in the transfer destination storage device 260 (transfer destination VOL ID), a maximum capacity of the logical volume, a used capacity of the logical volume, the average number of I/O commands processed for the logical volume (average throughput), an ID for a server that accesses the logical volume (accessing server ID), an ID for an application program that accesses the logical volume (accessing application ID), and an ID for a node making up the transfer destination storage device 260 (transfer destination node ID).

(Configuration of Application Information Table 235*f*)

FIG. 8 depicts a configuration example of the application information table 235*f* of the storage management apparatus 230. The application information table 235*f* holds information of an ID for a server on which an application program accessing a logical volume defined in the transfer origin storage device 250 is running (operation server ID), an ID for the application program (application ID), and a transfer priority level of the application program (a smaller priority level value represents a higher priority level).

(Configuration of Transfer Group Table 235g)

FIG. 9 depicts a configuration example of the transfer group table 235g of the storage management apparatus 230. The transfer group table 235g holds information of an ID for a group consisting of logical volumes to be transferred from the transfer origin storage device 250 to the transfer destination storage device 260 (group ID), an ID for a transfer origin logical volume included in the group (transfer origin logical volume ID), an ID for a server that accesses the logical volume (accessing server ID), an ID for an application program that accesses the logical volume (accessing application ID), and a transfer status of the logical volume.

(Configuration of Transfer Destination Storage Device Node Table 235j)

FIG. 10 depicts a configuration example of the transfer destination storage device node table 235j of the storage management apparatus 230. The transfer destination storage device node table 235j holds information of an ID for a node making up the transfer destination storage device 260 (node ID), a total capacity of the node, a used capacity of the node, a maximum throughput achieved by the node (total performance), a throughput made by a logical volume using the node (used performance), an ID for an instance used by the node (on-use instance ID), an ID for a logical volume connected to the node (on-use volume ID), the number of logical volumes being used (the number of on-use logical volumes), and a node group ID.

(Configuration of Storage Device Configuration/Operation Information Tables 255c and 265e)

FIG. 11 depicts a configuration example of the storage device configuration/operation information table 255c of the transfer origin storage device 250 and the storage device configuration/operation information table 265e of the transfer destination storage device 260. The storage device configuration/operation information tables 255c and 265e are identical in configuration, and each hold information of an ID for a logical volume defined (VOL ID), a maximum capacity of the logical volume, a used capacity of the logical volume, an average throughput the logical volume accepts, and an ID for an accessing server (accessing server ID).

(Configuration of Instance/Volume Type Storage Table 235k)

FIG. 12 depicts a configuration example of the instance/volume type storage table 235k of the storage management apparatus 230. The instance/volume type storage table 235k holds information of an ID for a node or a volume, a type representing either a node or a volume, performance the node or the volume offers, and a charge that should be paid to use the node or the volume.

(Various Processes Executed by Storage Management Apparatus 230)

Various processes executed by the storage management apparatus 230 will then be described with reference to FIGS. 13 to 16. Various processes shown in FIGS. 13 to 16 include a process shown in FIG. 13 of determining/creating a configuration of the transfer destination storage device 260, a process shown in FIG. 14 of creating a transfer group, a process shown in FIG. 15 of determining a volume transfer destination node, and a process shown in FIG. 16 of giving a data transfer instruction to the transfer origin server and the transfer destination storage device. These processes are executed in the order in which they are written here.

(Process of Determining/Creating Configuration of Transfer Destination Storage Device 260 According to First Embodiment)

Figure 13:
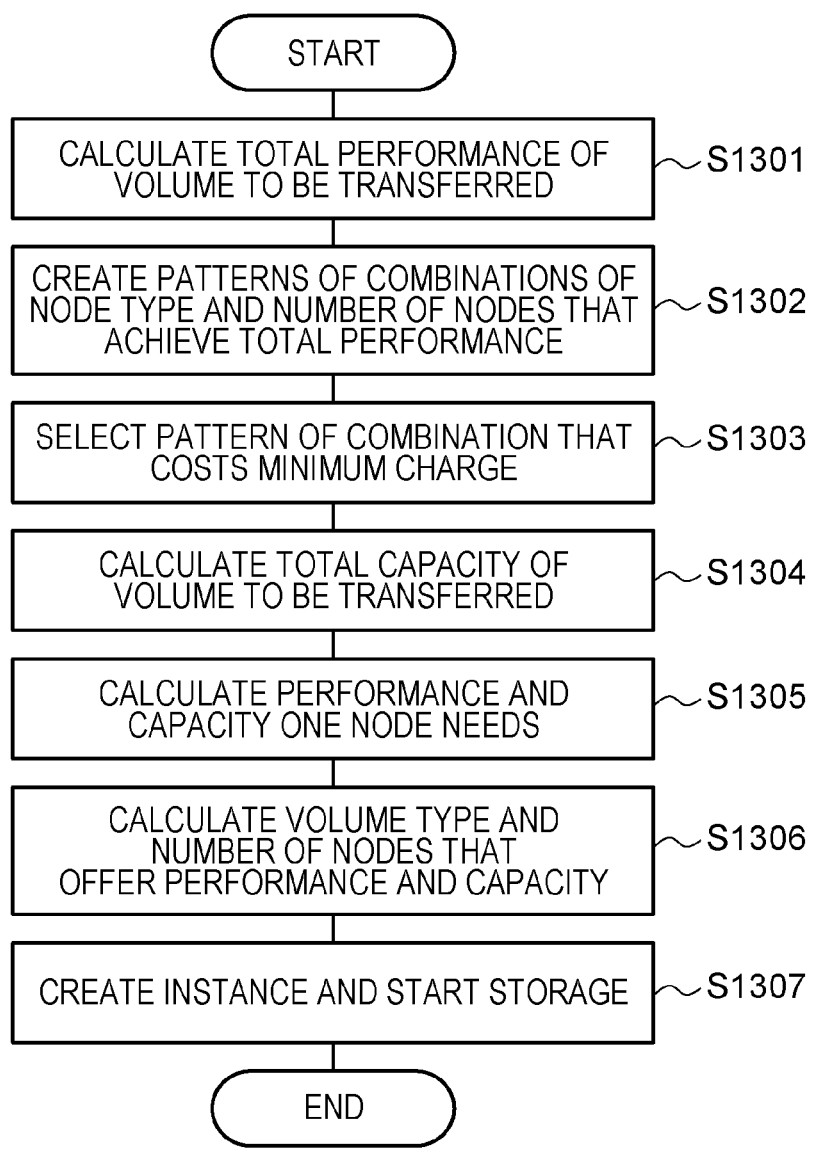
FIG. 13 is a flowchart of a process of determining/creating a configuration of the transfer destination storage device, the process being executed by the storage management apparatus, according to the first embodiment.

FIG. 13 is a flowchart of the process of determining/creating the configuration of the transfer destination storage device 260, the process being executed by the storage management apparatus 230 according to the first embodiment. This process is the process of causing the configuration creation instruction program 235e of the storage management apparatus 230 to define the configuration of the transfer destination storage device 260 and start the transfer destination storage device 260. This process is executed when the user gives a logical volume transfer instruction to the storage management apparatus 230.

The configuration creation instruction program 235e (FIG. 3) refers to the transfer origin storage device configuration/operation information table 235h (FIG. 3), and sums up average throughputs of volumes to be transferred, thereby calculating the total performance of the volumes to be transferred (S1301). The configuration creation instruction program 235e refers to the instance/volume type storage table 235k, creates a pattern of combination of nodes or volumes that achieves the total performance of the volumes to be transferred (S1302), and determines a pattern of combination that costs a minimum charge and the number of nodes grouped by the determined pattern of combination (S1303).

Subsequently, the configuration creation instruction program 235e refers to the transfer origin storage device configuration/operation information table 235h, and sums up maximum capacities of volumes to be transferred, thereby calculating a total capacity (S1304). The configuration creation instruction program 235e divides the total volume performance calculated at S1301 and the total volume capacity calculated at S1304 respectively by the number of nodes calculated at S1303. The resulting quotient represents the performance and the volume capacity that one node needs (S1305).

Subsequently, referring to the instance/volume type storage table 235k, the configuration creation instruction program 235e calculates a volume type that offers the performance and capacity one node needs and the number of nodes, and updates the transfer destination storage device node table 235j (S1306).

Through the above steps, specifications of nodes making up the transfer destination storage device 260 are set. Given this fact, the storage management apparatus 230 instructs the management server 295 to create an instance, and, following creation of the instance, starts the transfer destination storage device (S1307).

(Process of Creating Transfer Group According to First Embodiment)

Figure 14:
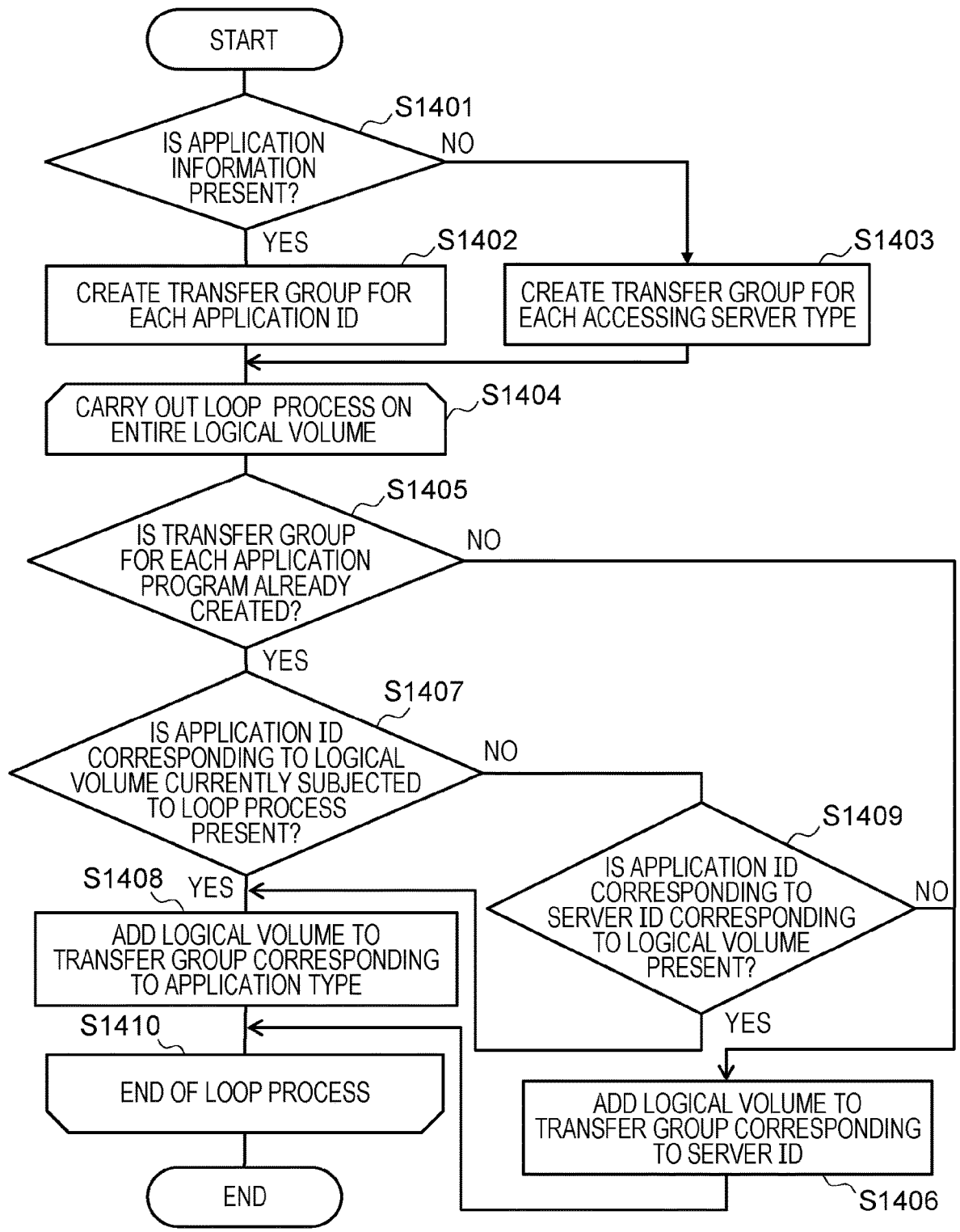
FIG. 14 is a flowchart of a process of creating a transfer group, the process being executed by the storage management apparatus, according to the first embodiment.

FIG. 14 is a flowchart of a process of creating a transfer group, the process being executed by the storage management apparatus 230, according to the first embodiment. This process is the process of causing the transfer group creating program 235c of the storage management apparatus 230 to group logical volumes to be transferred. This process is executed when the user gives a logical volume transfer instruction to the storage management apparatus 230.

The transfer group creating program 235c refers to the application information table 235f to check whether IDs for application programs that run on logical volumes to be transferred (application IDs) are stored in the table (S1401). When finding application IDs stored in the table (YES at S1401), the transfer group creating program 235c creates a transfer group for each application ID (S1402). When finding no application ID stored in the table (NO at S1401), the transfer group creating program 235c creates a transfer group for each server ID. The transfer group creating program 235c thus updates the transfer group table 235g (S1403).

After creating transfer groups at S1402 or S1403, the transfer group creating program 235c carries out a loop process of determining each group to which logical volumes belong, the loop process being carried out on the entire logical volumes (S1404 to S1410). In this loop process, the transfer group creating program 235c first refers to the transfer group table 235g, and checks whether a transfer group for each application program has been created for a logical volume currently subjected to the loop process (S1405). When a group for each application program is not created for the logical volume currently subjected to the loop process (NO at S1405), the transfer group creating program 235c refers to the transfer origin storage device configuration/operation information table 235h, and adds the logical volume to a transfer group corresponding to a server ID for a server accessed by the logical volume currently subjected to the loop process (S1406).

When a group for each application program has been created for the logical volume currently subjected to the loop process (YES at S1405), on the other hand, the transfer group creating program 235c refers to the accessing application ID column of the transfer origin storage device configuration/operation information table 235h, and checks whether the application ID corresponding to the logical volume currently subjected to the loop process is present (S1407). When finding that the application ID is present (YES at S1407), the transfer group creating program 235c adds the logical volume to the transfer group corresponding to the application ID (S1408).

When finding that the application ID is not present (NO at S1407), on the other hand, the transfer group creating program 235c refers to the application information table 235f to check whether the application ID corresponding to the server ID corresponding to the logical volume is present in the table (S1409). When finding that the corresponding application ID is present (YES at S1409), the transfer group creating program 235c proceeds to S1408. When finding that the corresponding application ID is no present (NO at S1409), the transfer group creating program 235c proceeds to S1406.

(Process of Determining Volume Transfer Destination Node According to First Embodiment)

Figure 15:
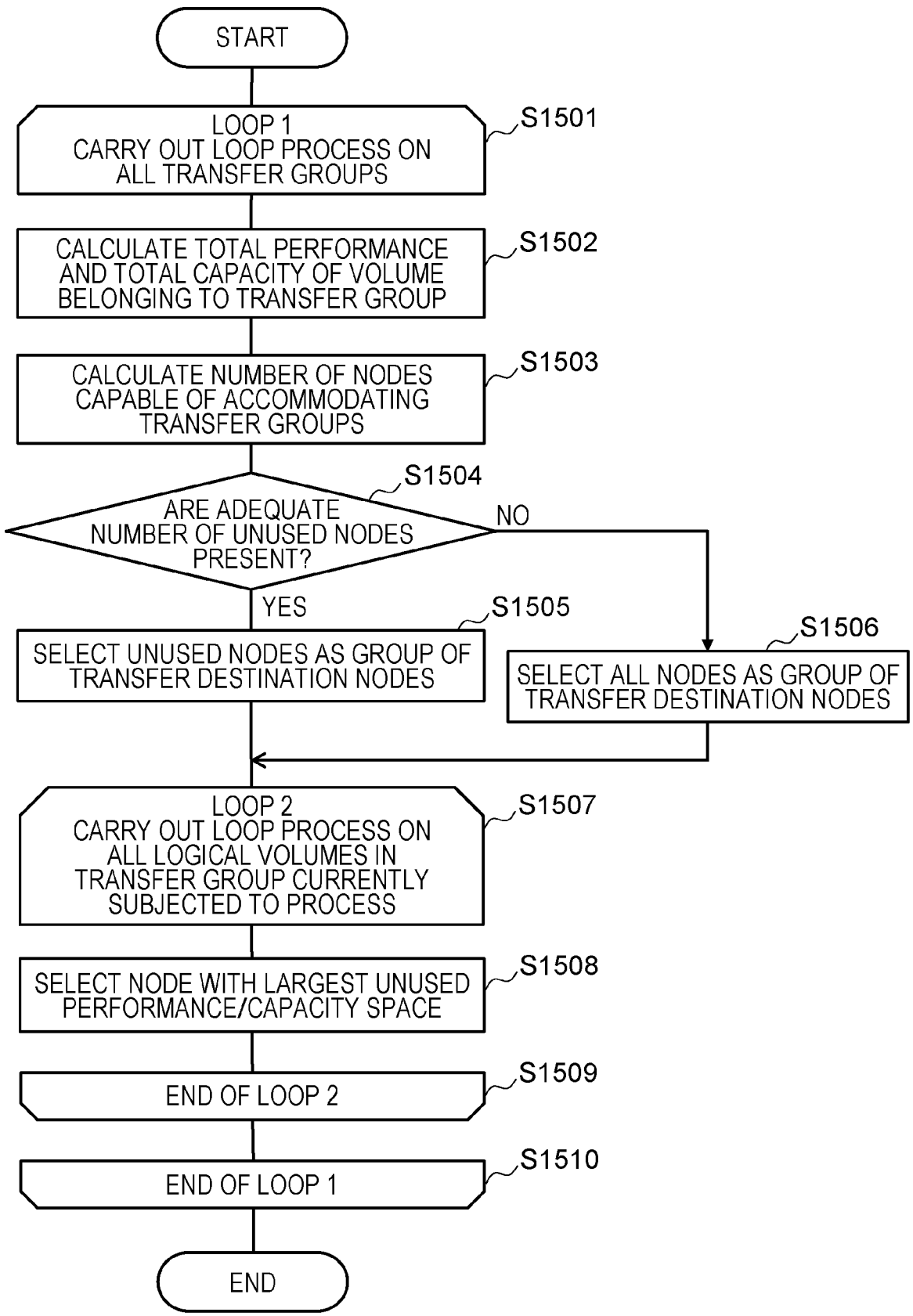
FIG. 15 is a flowchart of a process of determining a volume transfer destination node, the process being executed by the storage management apparatus, according to the first embodiment.

FIG. 15 is a flowchart of a process of determining a volume transfer destination node, the process being executed by the storage management apparatus 230, according to the first embodiment This process is the process of causing the transfer instruction program 235d of the storage management apparatus 230 to select, for each transfer group, a transfer destination node out of a group of nodes making up the transfer destination storage device 260 This process is executed after the process shown in FIG. 14 of creating a transfer group.

The transfer instruction program 235d carries out a loop process of determining a transfer destination node, the loop process being carried out on all logical volumes (S1501 to S1510). The transfer instruction program 235d carries out a loop process of selecting a node with a largest unused performance/capacity space, the loop process being carried out on logical volumes in the same group (S1507 to S1509).

Referring to the transfer destination storage device configuration/operation information table 235i, the transfer instruction program 235d calculates a total performance and a total maximum capacity of logical volumes belonging to a transfer group currently subjected to the process (S1502). The transfer instruction program 235d then refers to the transfer destination storage device configuration/operation information table 235i, and calculates the number of nodes needed to accommodate all logical volumes in the transfer group currently subjected to the process (S1503).

Subsequently, the transfer instruction program 235d determines whether unused nodes are present as nodes the number of which is adequate for accommodating all logical volumes in the transfer group currently subjected to the process (S1504). Specifically, referring to the transfer destination storage device node table 235j, the transfer instruction program 235d compares the number of nodes needed to accommodate all logical volumes in the transfer group currently subjected to the process with the number of unused nodes for which no logical volume is defined, and determines whether the number of unused nodes is larger than the number of nodes needed. When unused nodes as the number of nodes needed to accommodate all logical volumes are present, (YES at S1504), the transfer instruction program 235d selects unused nodes the number of which is adequate for accommodating all logical volumes in the transfer group currently subjected to the process, as a group of transfer destination nodes (S1505). When unused nodes as the number of nodes needed to accommodate all logical volumes are not present (NO at S1504), on the other hand, the transfer instruction program 235d selects the entire nodes including used nodes, as a group of transfer destination nodes (S1506). The transfer group is transferred to a pool created by nodes of individual transfer destination node groups making up the transfer destination storage device 260.

S1507 to S1509 to ensue represent a loop process carried out for each logical volume in each transfer group. The transfer instruction program 235d selects a node that can accommodate a logical volume of the transfer group currently subjected to the process and that has a largest unused performance space and/or unused capacity space, as a storage destination of the logical volume, thus updating the transfer destination storage device node table 235j (S1508).

(Data Transfer Instruction Process According to First Embodiment)

Figure 16:
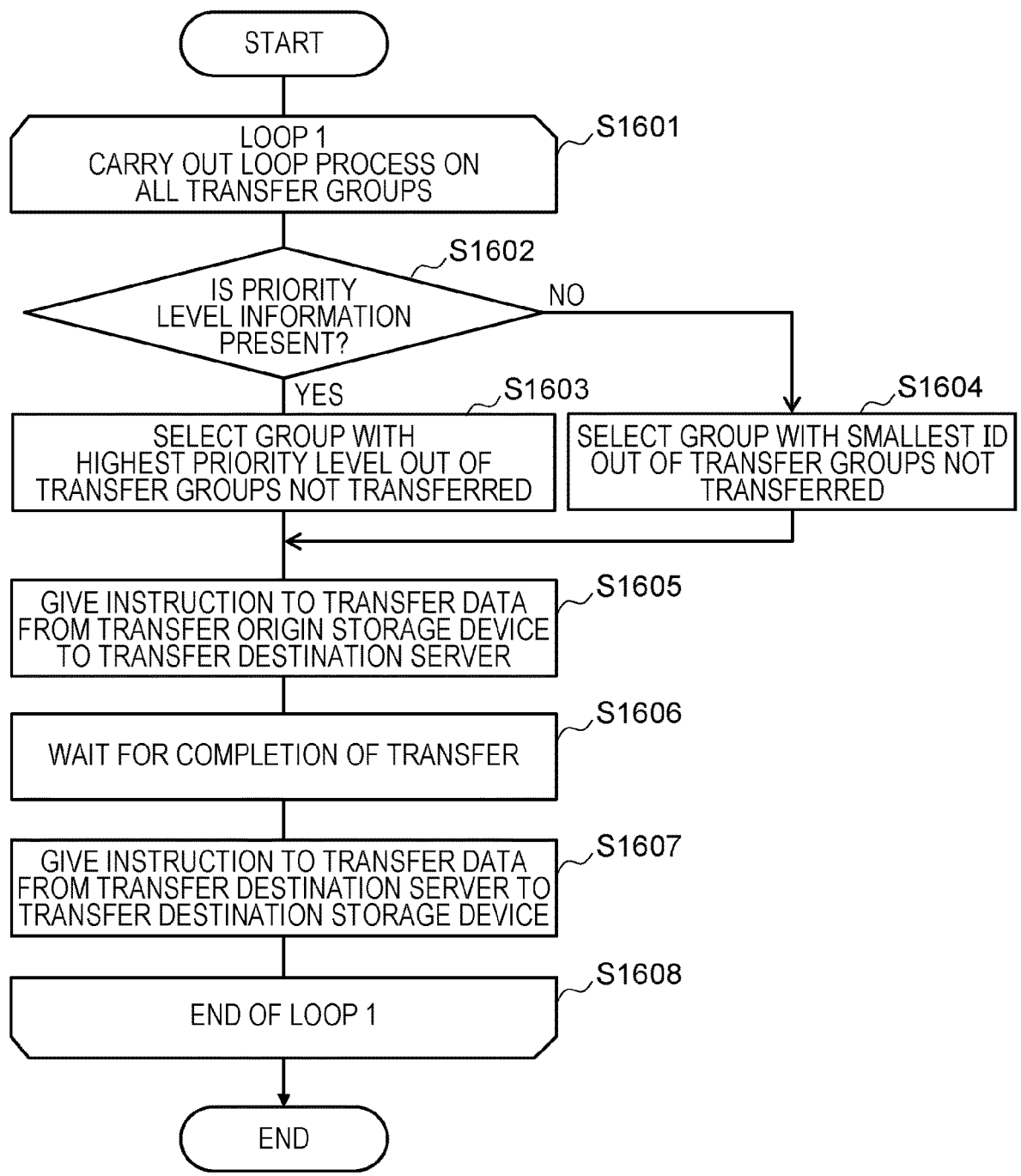
FIG. 16 is a flowchart of a process of instructing a transfer origin server and the transfer destination storage device to execute data transfer, the process being executed by the storage management apparatus, according to the first embodiment.

FIG. 16 is a flowchart of a process of instructing the transfer origin server and the transfer destination storage device to execute data transfer, the process being executed by the storage management apparatus 230, according to the first embodiment. This process is the process of causing the transfer instruction program 235d of the storage management apparatus 230 to give a volume transfer instruction and executing volume transfer according to the instruction. This process is started in response to an instruction given the user after the process shown in FIG. 15 of determining a volume transfer destination node is over. By this process, data is transferred from the transfer origin storage device 250 to the transfer destination server 220 via the transfer origin server 210, and then is stored in the transfer destination storage device 260. S1601 to S1608 represent a loop process carried out on every transfer group.

Referring to the transfer group table 235g, the transfer instruction program 235d checks whether priority levels are stored respectively for transfer groups (S1602). When priority levels are stored respectively for transfer groups (YES at S1602), the transfer instruction program 235d selects a transfer group with a highest priority level out of transfer groups not transferred, as a group to be transferred (S1603). When priority levels are not stored respectively for transfer groups (NO at S1602), the transfer instruction program 235d selects a transfer group with a smallest ID number out of transfer groups not transferred, as a group to be transferred (S1604).

Subsequently, the transfer instruction program 235d instructs the transfer origin server 210 to transfer the transfer group selected at S1603 or S1604 (S1605). Thereafter, the transfer instruction program 235d receives a transfer completion notice from the transfer origin server 210 as a result of completion of transfer of all logical volumes making up the transfer group (S1606), and then instructs the transfer destination storage device 260 to transfer data from the transfer destination server 220 to the transfer destination storage device 260 (S1607).

(Display Screen of First Embodiment)

Figure 17A:
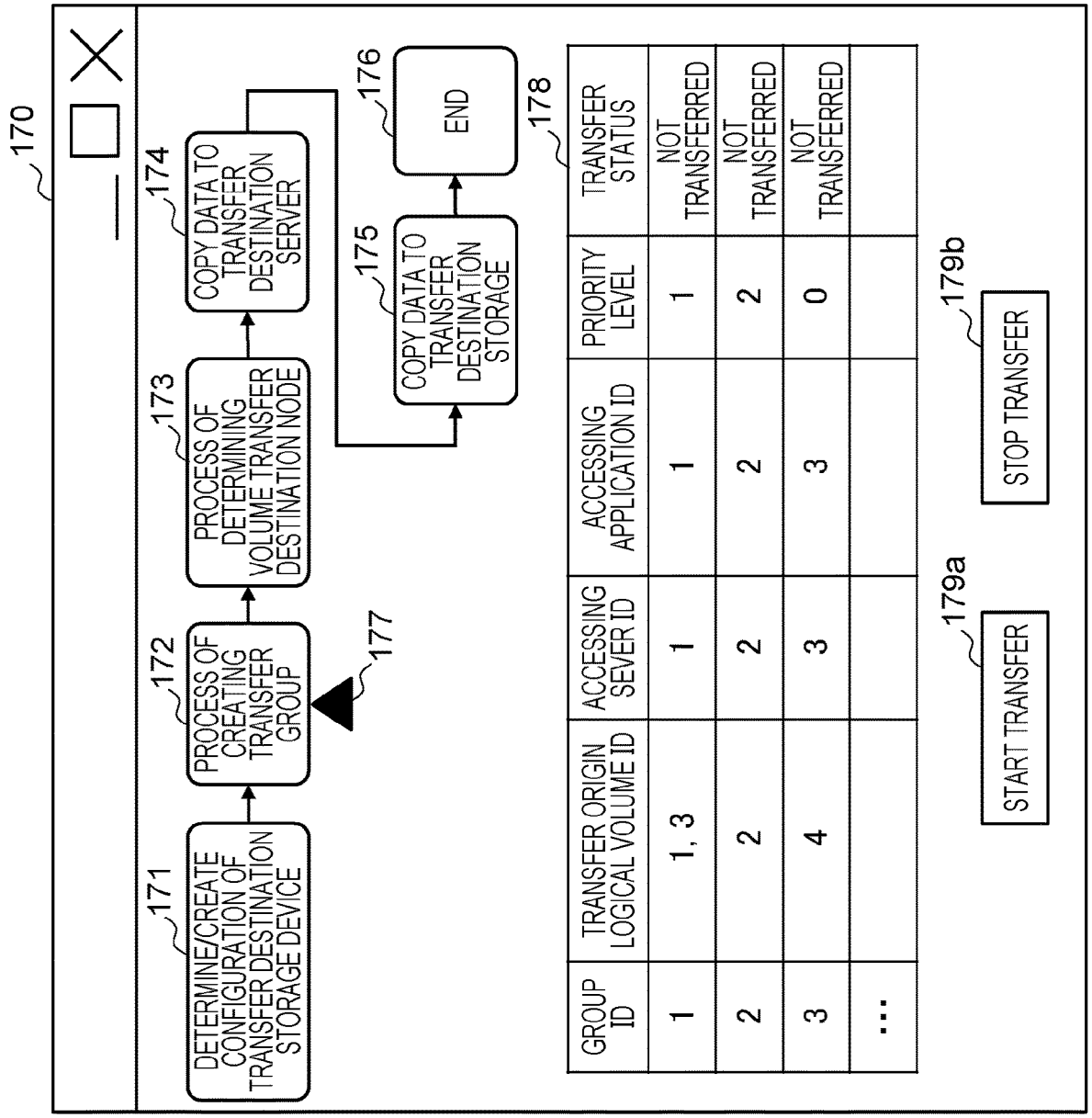
FIG. 17A depicts a configuration example of a display screen of the storage management apparatus according to the first embodiment.

FIG. 17A depicts a configuration example of a display screen 170 of the storage management apparatus 230 according to the first embodiment. On the display screen 170, for example, when an indicator 177 points at a display item 171, the process shown in FIG. 13 of determining/creating a configuration of the transfer destination storage device is in progress. When the indicator 177 points at a display item 172, the process shown in FIG. 14 of creating a transfer group is in progress. When the indicator 177 points at a display item 173, the process shown in FIG. 15 of determining a volume transfer destination node is in progress. When the indicator 177 points at a display item 174, data transfer from the transfer origin storage device to the transfer destination server (S1605) by the process shown in FIG. 16 of giving a data transfer instruction is in progress. When the indicator 177 points at a display item 175, data transfer from the transfer destination server to the transfer destination storage device (S1607) by the process shown in FIG. 16 of giving a data transfer instruction is in progress. In a display area 178, the transfer group table 235g is displayed.

When a transfer start button 179a is pressed on the display screen 170, the process of determining/creating a configuration of the transfer destination storage device (FIG. 13) is started. Subsequently, the process of creating a transfer group (FIG. 14), the process of determining a volume transfer destination node (FIG. 15), and the process of giving data transfer instruction (FIG. 16) are executed in sequence to copy data to the transfer destination server and to the transfer destination storage server. When the data copying is over, a series of data transfer processes depicted in FIGS. 13 to 16 come to an end. A press to a cancel button 179b instantly cancels the series of data transfer processes shown in FIGS. 13 to 16.

Figure 17B:
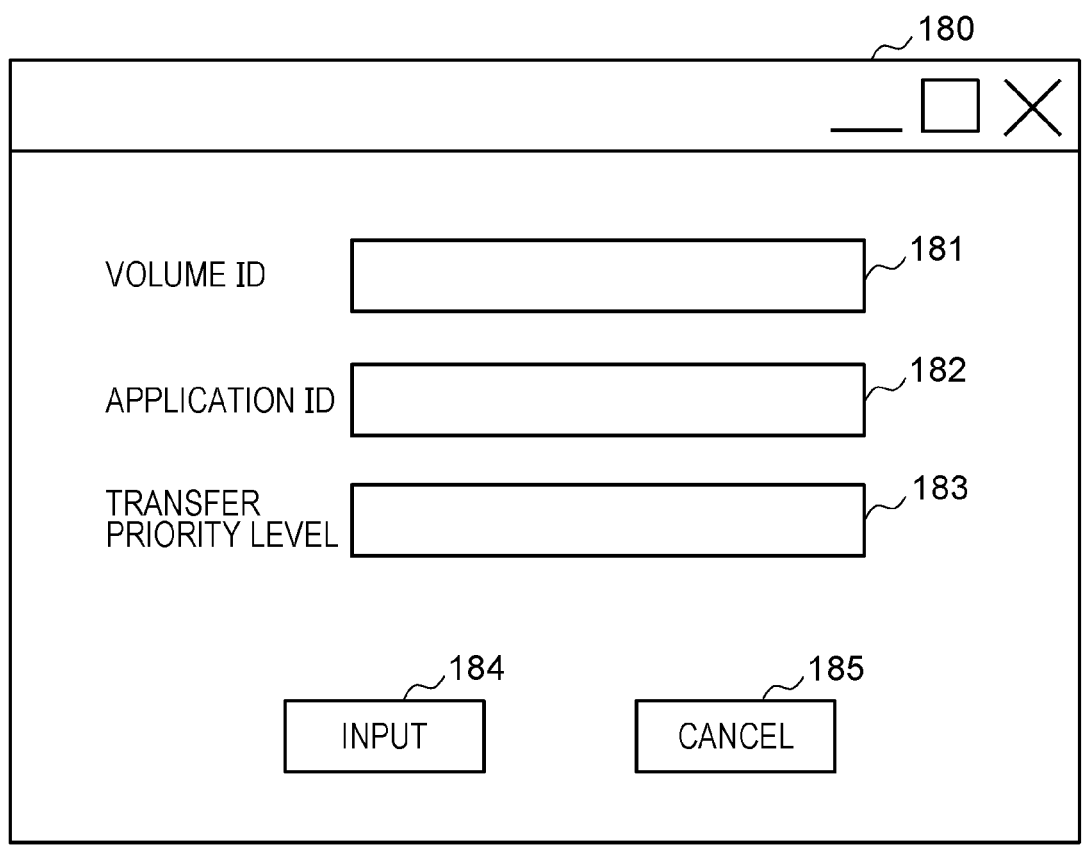
FIG. 17B depicts a configuration example of a user interface of the storage management apparatus according to the first embodiment.

FIG. 17B shows a configuration example of a user interface screen 180, where the application information acquiring program 235b of the storage management apparatus 230 receives the user's input of setting items on each logical volume, such as an application ID for an application program using the logical volume, and a transfer priority level of the application program. Use input indicated in FIGS. 17A and 17B is made not only by the graphical user interface (GUI). It may be made also by a character-based user interface (CUI) or by direct transmission of data carrying input values.

Second Embodiment

A second embodiment will be described, with focus put on differences with the first embodiment. Aspects common to the first and second embodiments will be omitted or just briefed in further description. In the first embodiment, by determining the configuration of the transfer destination storage device 260 in advance and determining the transfer destination node for each logical volume, influences data transfer exerts on the I/O process is reduced. However, because a case of adding a logical volume to be transferred may arise, a device configuration of the transfer destination storage device may be extended according to a transfer status. In the second embodiment, a case will be described where a device configuration of the transfer destination storage device is extended according to a transfer status and then a transfer destination node is selected.

(Process of Defining Configuration of Transfer Destination Storage Device 260, Transferring Data, and Extending Cluster during Data Transfer, According to Second Embodiment)

Figure 18:
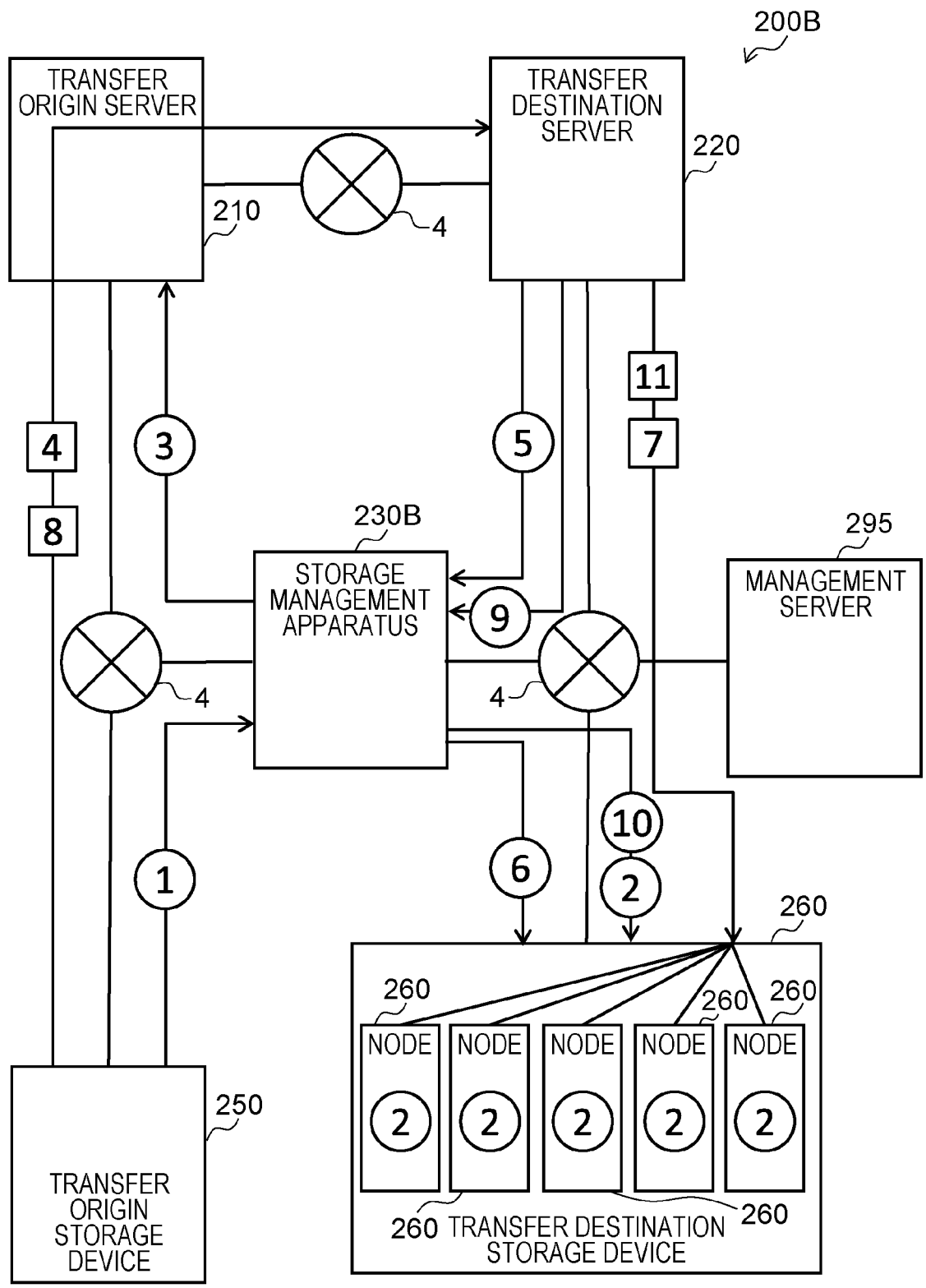
FIG. 18 is a schematic diagram of a process of defining a configuration of a data transfer destination storage device, transferring data, and extending a cluster during data transfer, the process being executed by a storage management apparatus, according to a second embodiment.

FIG. 18 is a schematic diagram of a process of defining a configuration of the transfer destination storage device 260, transferring data, and extending a cluster during data transfer, the process being executed by a storage management apparatus 230B, according to the second embodiment.

A storage system 200B includes the storage management apparatus 230B, the transfer origin server 210, the transfer destination server 220, the storage management apparatus 230B, the transfer origin storage device 250, and the transfer destination storage device 260.

Arrows in FIG. 18 indicate flows of information necessary for processing or flows of data to be transferred. Numbers appended to arrows in FIG. 18 indicate the order of flows of information necessary for processing or flows of data to be transmitted. Among these numbers, numbers in circles indicate flows of information necessary for processing, and numbers in squares indicate flows of data to be transmitted. "1" to "7" appended to arrows in FIG. 18 represent the same flows of information as indicated in FIG. 1.

In a case of carrying out additional data transfer, the transfer origin server 210 transfers data from the transfer origin storage device 250 to the transfer destination server 220 ("8" in FIG. 18), and the storage management apparatus 230B receives a notice of completion of data transfer to the transfer destination server 220 ("9" in FIG. 18) and then adds a node to the transfer destination storage device 260 ("10" in FIG. 18). After receiving the node added thereto, the transfer destination storage device 260 transfers data from the transfer destination server 220 to the added node ("11" in FIG. 18).

(Process of Determining Volume Transfer Destination Node According to Second Embodiment)

Figure 19:
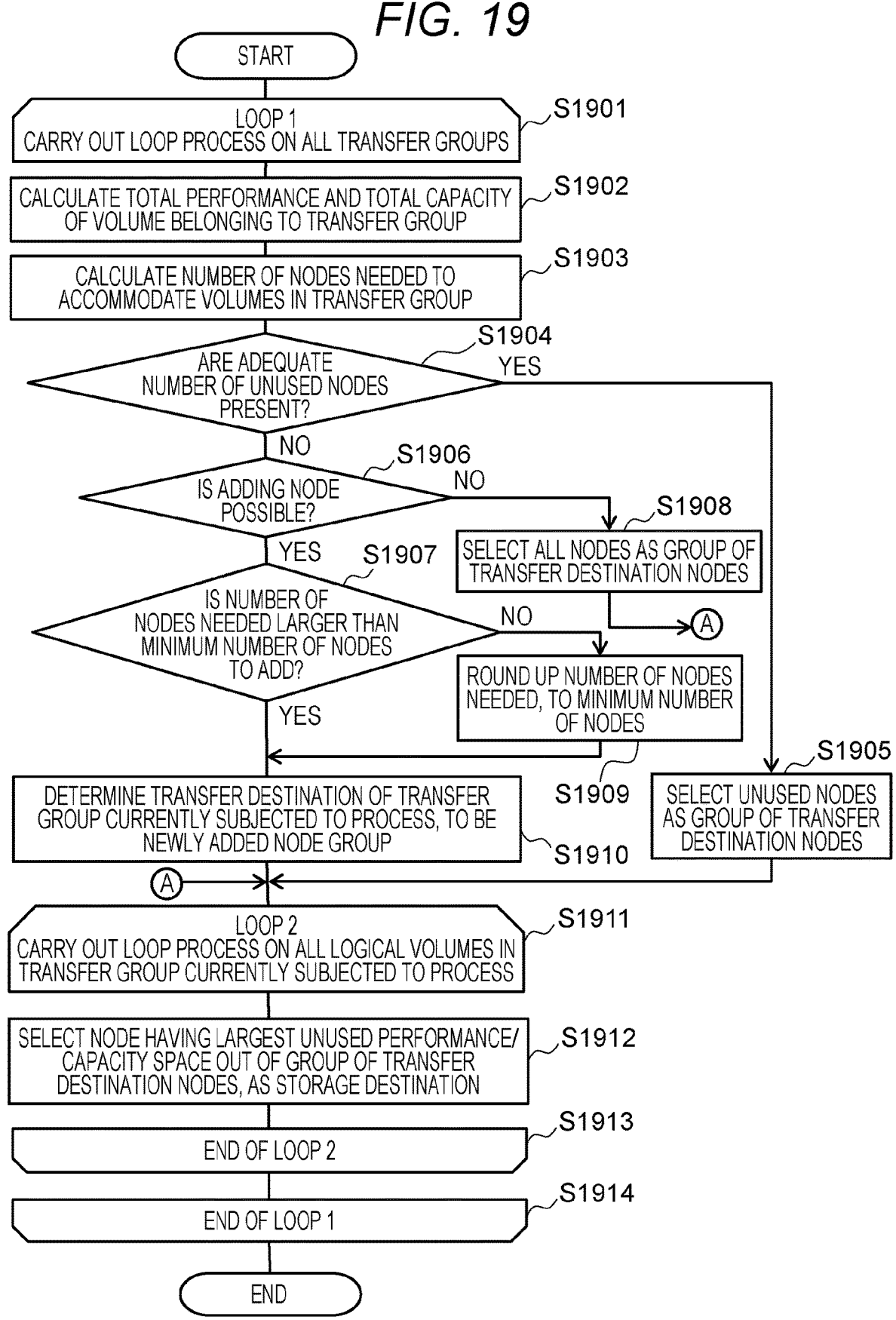
FIG. 19 is a flowchart of a process of determining a volume transfer destination node, the process being executed by the storage management apparatus, according to the second embodiment.

FIG. 19 is a flowchart of a process of determining a volume transfer destination node, the process being executed by the storage management apparatus 230B, according to the second embodiment In the second embodiment, the process shown in FIG. 19 is executed in place of the process shown in FIG. 15 of determining a volume transfer destination node according to the first embodiment. This process, which is shown as a flowchart, is the process of selecting, for each transfer group, a transfer destination node out of a group of nodes making up the transfer destination storage device 260, the process being executed by the transfer instruction program 235d of the storage management apparatus 230. This process is started when a data transfer instruction from the user is received.

S1901 to S1913 represent a loop process executed on all transfer groups.

Referring to the transfer origin storage device configuration/operation information table 235h, the transfer instruction program 235d calculates a total performance and a total maximum capacity of logical volumes belonging to a transfer group currently subjected to the process (S1902). The transfer instruction program 235*d* then refers to the transfer destination storage device node table 235*j*, and calculates the number of nodes needed to accommodate all logical volumes in the transfer group currently subjected to the process (S1903).

Subsequently, the transfer instruction program 235*d* determines whether unused nodes are present as nodes the number of which is adequate for accommodating all logical volumes in the transfer group currently subjected to the process (S1904). Specifically, referring to the transfer destination storage device node table 235*j*, the transfer instruction program 235*d* compares the number of nodes needed to accommodate all logical volumes in the transfer group currently subjected to the process with the number of unused nodes for which no logical volume is defined, and determines whether the number of unused nodes is larger than the number of nodes needed. When unused nodes as the number of nodes needed to accommodate all logical volumes are present (YES at S1904), the transfer instruction program 235*d* selects unused nodes the number of which is adequate for accommodating all logical volumes in the transfer group currently subjected to the process, as a group of transfer destination nodes (S1905), and proceeds to S1911. When unused nodes as the number of nodes needed are not present (NO at S1904), the transfer instruction program 235*d* proceeds to S1906.

At S1906, the transfer instruction program 235*d* determines whether adding a node to ensure the number of nodes needed to accommodate all logical volumes in the transfer group currently subjected to the process is possible. Adding a node is possible, for example, in a case where the transfer destination storage device 260 is in operation. Adding a node is impossible, for example, in a case where the transfer destination storage device 260 is not in operation. When adding a node is possible (YES at S1906), the transfer instruction program 235*d* proceeds to S1907. When adding a node is impossible (NO at S1906), the transfer instruction program 235*d* proceeds to S1908. At S1908, the transfer instruction program 235*d* selects all nodes as a group of transfer destination nodes, and proceeds to S1911.

At S1907, the transfer instruction program 235*d* compares the number of nodes needed to accommodate all logical volumes in the transfer group currently subjected to the process with the number of nodes that can be added as a minimum number of nodes to add. When the number of nodes needed is larger than the minimum number of nodes to add (YES at S1907), the transfer instruction program 235*d* proceeds to S1910. When the number of nodes needed is equal to or smaller than the minimum number of nodes to add (No at S1907), the transfer instruction program 235*d* proceeds to S1909. At S1909, the transfer instruction program 235*d* rounds up the number of nodes needed, to the minimum number of nodes to add, and proceeds to S1910.

At S1910, the transfer instruction program 235*d* determines a transfer destination of the transfer group currently subjected to the process, to be a newly added node group, and proceeds to S1911.

S1911 to S1913 represent a loop process carried out on each logical volume in each transfer group. At S1912, the transfer instruction program 235*d* selects a node that can accommodate a logical volume currently subjected to the process and that has a largest unused performance/capacity space, as a storage destination of the logical volume, thus updating the transfer destination storage device node table 235*j*.

(Process of Giving Instructing to Execute Data Transfer and Extension of Transfer Destination Storage Device According to Second Embodiment)

Figure 20:
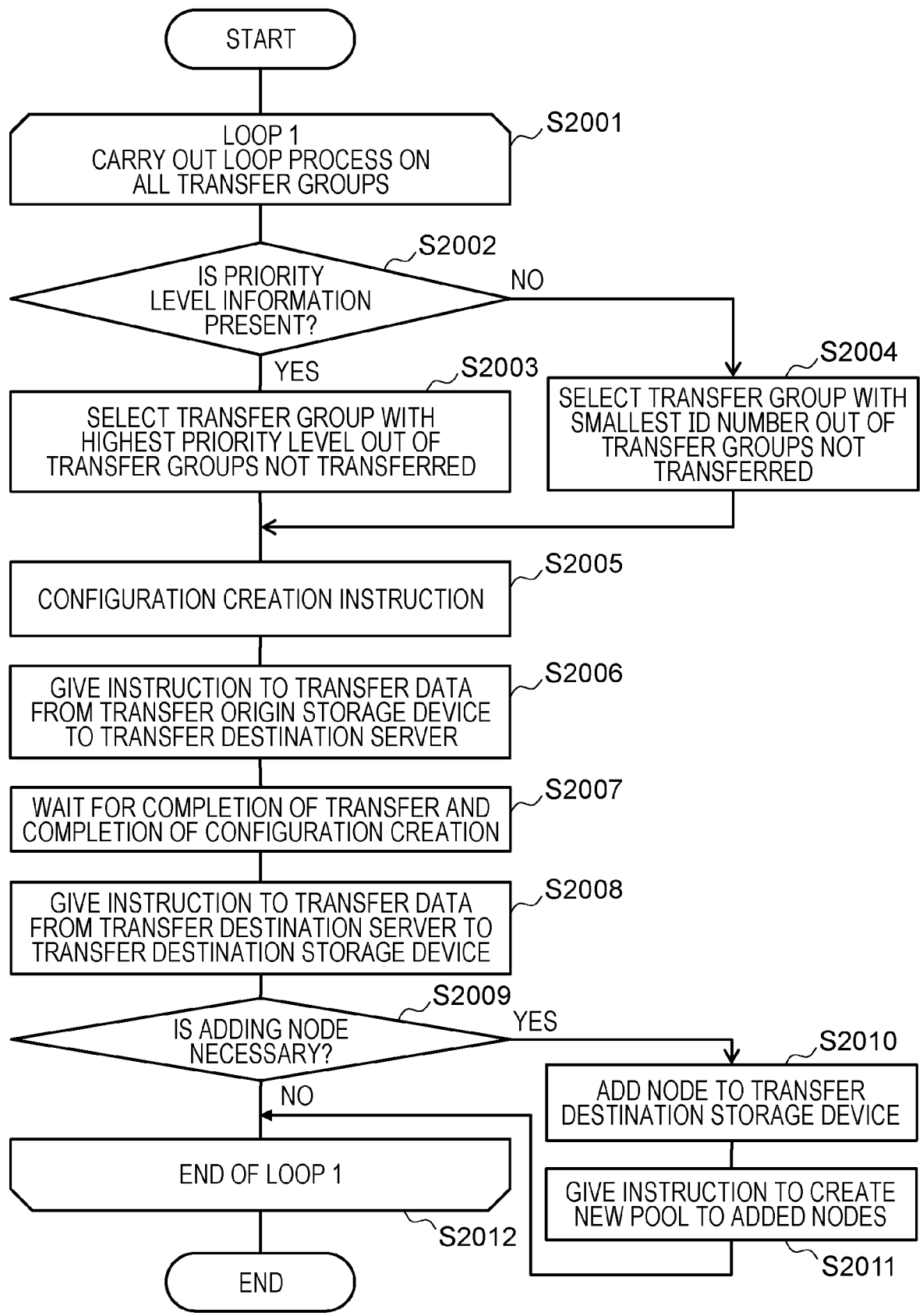
FIG. 20 is a flowchart of a process of instructing a transfer origin server and the transfer destination storage device to execute data transfer and extension of the transfer destination storage device, the process being executed by the storage management apparatus, according to the second embodiment.

FIG. 20 is a flowchart of a process of instructing the transfer origin server and the transfer destination storage device to execute data transfer and extension of the transfer destination storage device, the process being executed by the storage management apparatus, according to the second embodiment. In the second embodiment, the process shown in FIG. 20 is executed in place of the process shown in FIG. 16 of giving an instruction to execute data transfer in the first embodiment. This process is started in response to a user instruction after the process of selecting a transfer destination node for each transfer group is over. By this process, data is transferred from the transfer origin storage device 250 to the transfer destination server 220 via the transfer origin server 210, and then is stored in the transfer destination storage device 260.

S2001 to S2112 Represent a Loop Process Carried Out on Every Transfer Group

Referring to the transfer group table 235*g*, the transfer instruction program 235*d* checks whether priority levels are stored respectively for transfer groups (S2002). When priority levels are stored respectively for transfer groups in the transfer group table 235*g* (YES at S2002), the transfer instruction program 235*d* selects a transfer group with a highest priority level out of transfer groups not transferred, as a group to be transferred (S2003). When priority levels are not stored respectively for transfer groups in the transfer group table 235*g* (NO at S2002), the transfer instruction program 235*d* selects a transfer group with a smallest ID number out of transfer groups not transferred, as a group to be transferred (S2004).

Subsequently, the transfer instruction program 235*d* instructs the management server 295 to create/start the transfer destination storage device 260 (S2005). Thereafter, the transfer instruction program 235*d* instructs the transfer origin server 210 to transfer each transfer group not transferred yet (S2006). The transfer instruction program 235*d* then receives a notice of completion of transferring each transfer group, from the transfer origin server 210, and waits for a notice of completion of the start of the transfer destination storage device 260, the notice coming from the management server 295 (S2007). When receiving the notice of completion of transferring each transfer group, from the transfer origin server 210 and receiving the notice of completion of the start of the transfer destination storage device 260, from the management server 295 as well, the transfer instruction program 235*d* instructs the transfer destination storage device 260 to transfer data from the transfer destination server 220 to the transfer destination storage device 260 (S2008).

Referring to the transfer destination storage device node table 235*j*, the transfer instruction program 235*d* determines whether a process of extending the transfer destination storage device 260 is necessary in preparation for transfer of the next transfer group (S2009). The process of extending the transfer destination storage device 260 means node addition. When the extension process is necessary (YES at S2009), the transfer instruction program 235*d* instructs the management server 295 to add a node to the transfer destination storage device 260 (S2010). The transfer instruction program 235*d* then instructs the transfer destination storage device 260 to create a new pool by linking added nodes together (S2011). A pool is a logical storage area in which data is shared between nodes. Dividing a pool into sub-pools makes rebalancing between pools unnecessary, and therefore influences on the I/O process resulting from data migration by storage devices can be suppressed. Dividing a pool means creating a plurality of sub-pools, that is, dividing a single pool made up of the entire nodes into sub-pools. The sub-pools are each formed of a different combination of nodes. One node may be allocated to one pool only or may be allocated to multiple pools.

The present invention is not limited to the above embodiments but includes various modifications. For example, the above embodiments have been described in detail for easy understanding of the present invention, and are not necessarily limited to an embodiment including all constituent elements described above. Some constituent elements of an embodiment may be replaced with constituent elements of another embodiment, and a constituent element of an embodiment may be added to a constituent element of another embodiment. Such replacement and addition, however, must involve no inconsistency. Each embodiment may have some of its constituent elements deleted or replaced, or added, integrated, or distributed to another embodiment. In addition, constituent elements and processes described in the embodiments may be distributed, integrated, or exchanged when necessary, based on processing efficiency or implementation efficiency.

What is claimed is:

1. A storage system comprising:
a memory;
a communication interface that is communicatively coupled to a plurality of nodes via a network; and
one or more processors communicatively coupled to the memory and the communication interface,
wherein the one or more processors are collectively configured to:
form a pool from a plurality of pool volumes that are stored in one or more of the plurality of nodes,
allocate a respective pool volume from the pool to a host, wherein a data input/output process of inputting/outputting data to/from is executed through the respective pool volume, and
perform a rebalancing of the pool by transferring one or more volumes between the plurality of nodes in such a way as to equalize throughput of the data input/output process and/or data capacities in the pool,
wherein the rebalancing includes:
grouping the one or more volumes into a plurality of groups for which transfer order is specified, and
transferring the one or more volumes according to the plurality of groups, wherein at a point of time of completion of transfer of each group of the plurality of groups, a transfer destination node for the one or more volumes is determined in such a way as to equalize throughput of the data input/output process and/or data capacities in the pool.

2. The storage system according to claim 1,
wherein the grouping is carried out, based on the host or an application program that uses the volumes, and
wherein the transfer destination node for the volumes is determined in such a way as to equalize throughput of the data input/output process and/or data capacities in each group.

3. The storage system according to claim 2, wherein for each group in the plurality of groups, a respective transfer destination node for a group of the volumes is sequentially determined, based on an unused resource space of one or more of the plurality of nodes that results when transfer of volumes preceding the group of the volumes is completed.

4. The storage system according to claim 1, comprising a plurality of pools formed of different combinations of the nodes,
wherein when a plurality of external volumes are transferred to a node in the storage system, the one or more processors are further collectively configured to:
determine an order of for the transfer of the plurality of the external volumes based on the pool to which the volumes are transferred, and executes volume transfer.

5. A data transfer method, the method comprising:
forming a pool from a plurality of pool volume that are stored in one or more of a plurality of nodes;
allocating a respective pool volume from the pool to a host, wherein a data input/output process of inputting/outputting data to/from is executed through the respective pool volume; and
performing a rebalancing of the pool by transferring one or more volumes between the plurality of nodes in such a way as to equalize throughput of the data input/output process and/or data capacities in the pool;
wherein the rebalancing includes:
grouping the one or more volumes into a plurality of groups for which transfer order is specified, and
transferring the one or more volumes according to the plurality of groups, wherein at a point of time of completion of transfer of each group of the plurality of groups, a transfer destination node for the one or more volumes is determined in such a way as to equalize throughput of the data input/output process and/or data capacities in the pool.

6. A non-transitory computer readable storage medium storing instructions, the instructions when executed by one or more processors of a data storage system, cause the one or more processors to collectively execute a method comprising:
forming a pool from a plurality of pool volume that are stored in one or more of a plurality of nodes;
allocating a respective pool volume from the pool to a host, wherein a data input/output process of inputting/outputting data to/from is executed through the respective pool volume; and
performing a rebalancing of the pool by transferring one or more volumes between the plurality of nodes in such a way as to equalize throughput of the data input/output process and/or data capacities in the pool;
wherein the rebalancing includes:
grouping the one or more volumes into a plurality of groups for which transfer order is specified, and
transferring the one or more volumes according to the plurality of groups, wherein at a point of time of completion of transfer of each group of the plurality of groups, a transfer destination node for the one or more volumes is determined in such a way as to equalize throughput of the data input/output process and/or data capacities in the pool.

7. The storage system according to claim 1,
wherein a new pool is created by linking new nodes together when the new nodes are added to the plurality of nodes.

8. The data transfer method according to claim 5,
wherein a new pool is created by linking new nodes together when the new nodes are added to the plurality of nodes.

9. The non-transitory computer readable storage medium according to claim 6, wherein a new pool is created by linking new nodes together when the new nodes are added to the plurality of nodes.

10. The storage system according to claim 1, wherein the one or more processors are further collectively configured to:
   increase a number of the nodes in the plurality of nodes according to a transfer status of the plurality of the pool volumes.

11. The data transfer method according to claim 5, further comprising:
   increasing a number of the nodes in the plurality of nodes according to a transfer status of the pool.

12. The non-transitory computer readable storage medium according to claim 6, the method further comprising:
   increasing a number of the nodes in the plurality of nodes according to a transfer status of the pool.

* * * * *